(12) United States Patent
Bamba et al.

(10) Patent No.: US 11,887,309 B2
(45) Date of Patent: Jan. 30, 2024

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Yasuo Bamba, Tokyo (JP); Hajime Muta, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 473 days.

(21) Appl. No.: 17/189,301

(22) Filed: Mar. 2, 2021

(65) Prior Publication Data

US 2021/0287374 A1    Sep. 16, 2021

(30) Foreign Application Priority Data

Mar. 13, 2020  (JP) ................. 2020-044386

(51) Int. Cl.
 *G06K 9/00* (2022.01)
 *G06T 7/10* (2017.01)
 *G06T 1/00* (2006.01)

(52) U.S. Cl.
 CPC .............. *G06T 7/10* (2017.01); *G06T 1/0007* (2013.01); *G06T 2207/30121* (2013.01)

(58) Field of Classification Search
 CPC ................. G06T 7/10; G06T 1/0007; G06T 2207/30121
 See application file for complete search history.

(56) References Cited

U.S. PATENT DOCUMENTS

| | | | |
|---|---|---|---|
| 2013/0307974 A1* | 11/2013 | Kawano | G06V 20/52 348/143 |
| 2016/0284064 A1* | 9/2016 | Morofuji | H04N 25/61 |
| 2017/0039728 A1* | 2/2017 | Bamba | G06V 20/52 |
| 2018/0285656 A1* | 10/2018 | Yano | G06V 10/764 |
| 2019/0130677 A1* | 5/2019 | Kitagawa | G06V 20/52 |
| 2020/0302188 A1* | 9/2020 | Iwai | G06T 7/60 |

FOREIGN PATENT DOCUMENTS

JP     2018-180619 A     11/2018

OTHER PUBLICATIONS

Shafique, K. et al., "A Non-Iterative Greedy Algorithm for Multi-frame Point Correspondence" IEEE transactions on pattern analysis and machine intelligence (Jan. 2005) pp. 1-6, vol. 27, issue 1.

* cited by examiner

*Primary Examiner* — Avinash Yentrapati
(74) *Attorney, Agent, or Firm* — Carter, DeLuca & Farrell LLP

(57) ABSTRACT

An image processing apparatus comprises a setting unit configured to set, based on a detection line that is set in a display screen, a patch region in the display screen, the patch region including a detection region serving as a region for detecting a position of an object, and a counting region encompassed by the detection region, and a counting unit configured to count, from among intersection points between a movement vector in the detection region of an object moving inside the display screen or a locus based on the movement vector and the detection line in the detection region, intersection points located in the counting region.

11 Claims, 10 Drawing Sheets

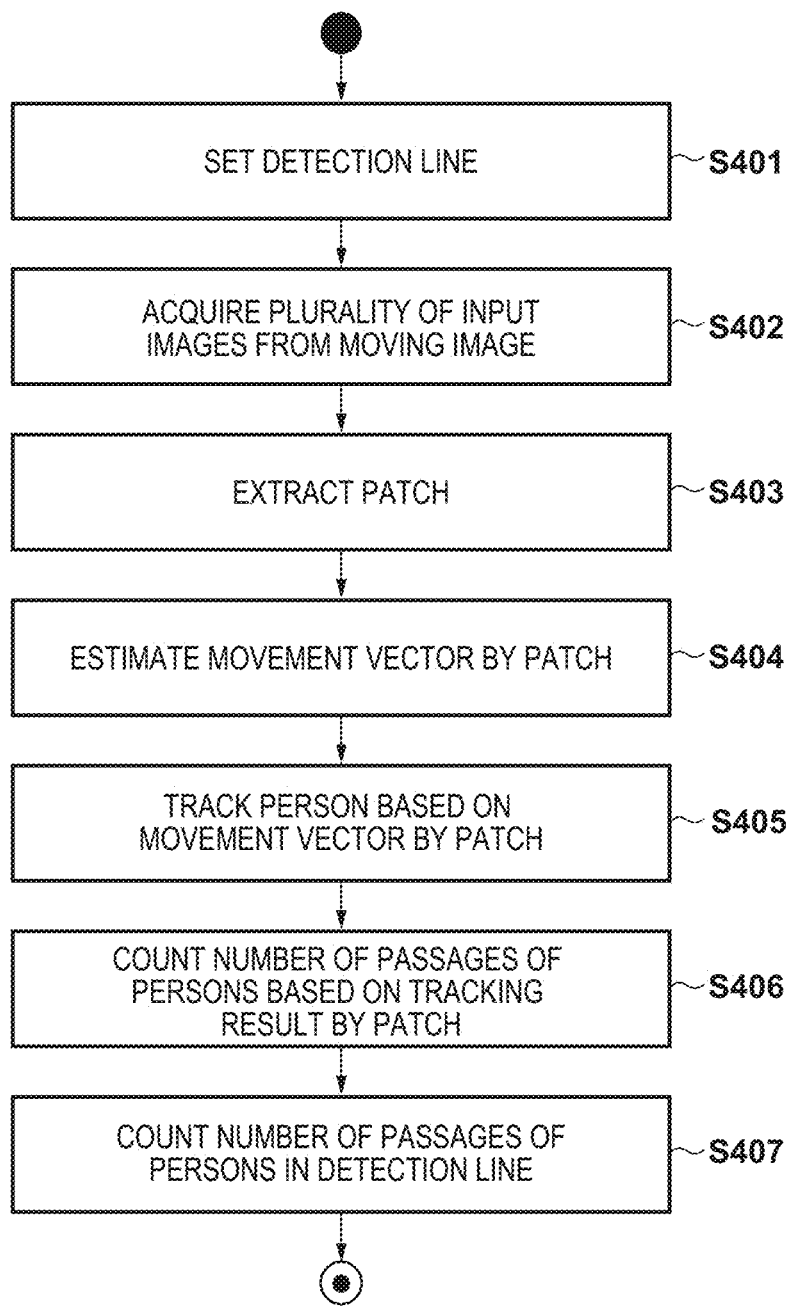

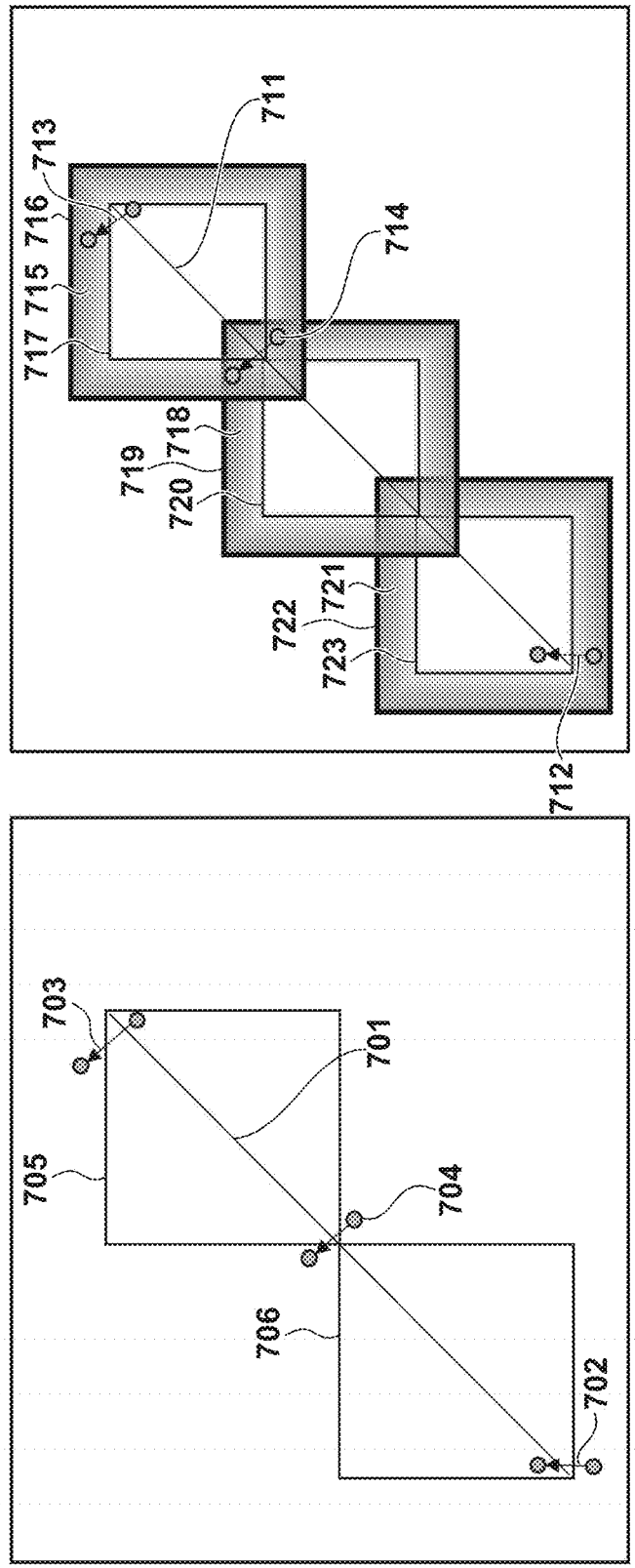

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium, particularly to a moving image analysis technique.

Description of the Related Art

In recent years, apparatuses that analyze the human flow in an imaging region, based on images captured by a camera or the like. As specific methods for analyzing the human flow there are methods of counting the number of persons that have passed over a detection line, which is a virtual line drawn on an image.

In a facility in which many people gather, the number of persons staying inside the facility can be estimated by counting the number of persons entering and exiting from the entrance of the facility. Also, it is expected to identify an entrance with a high congestion degree or an entrance where jamming has occurred, thereby preventing accidents and criminal activities resulting from congestion.

In Khurram Shafique and Mubarak Shah. A Non-Iterative Greedy Algorithm for Multi-frame Point Correspondence. IEEE transactions on pattern analysis and machine intelligence (2005) (hereinafter referred to as Non-Patent Document 1), a method is disclosed in which tracking of a plurality of points is performed by associating points detected at each time of day with each other over a plurality of frames. Japanese Patent Laid-Open No. 2018-180619 (hereinafter referred to as Patent Document 1) discloses dividing chronologically successive images into a plurality of local regions to obtain a plurality of divided regions, extracting the number and the movement features of objects for each divided region, and integrating the extracted numbers and movement features, thereby estimating the flow of objects in the divided regions.

The technique disclosed in Non-Patent Document 1 performs the detection of points for the entire screen, without narrowing the detection range for the points according to the location of the detection line, and therefore has the problem of an increased processing time for counting the number of passages. In order to count the number of passages at high speed, it is conceivable to analyze a human flow only for the surroundings of the detection line, and determine the intersections between the human flow and the detection line.

The technique disclosed in Patent Document 1 adopts a method in which a flow of objects is estimated for each divided region. Based on this concept, by counting the number of object passages only in a divided region through which a detection line passes, and summing up the results, the number of object passages for the detection line as a whole can be obtained. Here, because the number of passages can be independently counted for each divided region, the number of persons can be counted at high speed by parallelizing the processing for each divided region.

However, according to Patent Document 1, the method for dividing images remains unchanged regardless of the position of the detection line. When the method for dividing images is kept unchanged, a problem arises that results of counting the number of passages may be incorrect depending on the relationship between the detection line and the divided region. An example of this problem is shown in FIG. 1.

FIG. 1 shows an example of an input image 100 in which a detection line 101 is set by a user. In this case, in order to count the number of object passages for the detection line 101, the number of object passages is counted in each of divided regions 102, 103, and 104. Each of arrows 105, 106, 107, and 108 is a movement vector indicating the movement of a given object from a position (start point) at time t1 to a position (end point) at time t2. For an object for which the start point and the end point are both located within the divided region 104 as indicated by the arrow 105, the passage of this object can be detected in the divided region 104. However, the passage of an object corresponding to the arrow 106 for which the start point and the end point are located in different divided regions, and the passage of objects corresponding to the arrows 107 and 108 for which at least one of the start point and the end point is located outside the divided regions cannot be detected in any of the divided regions 102, 103, and 104. This leads to a problem in that the number of passages for the detection line as a whole is smaller than the actual number of passages.

SUMMARY OF THE INVENTION

The present invention provides a technique for more accurately counting the number of objects passing over a detection line.

According to the first aspect of the present invention, there is provided an image processing apparatus comprising: a setting unit configured to set, based on a detection line that is set in a display screen, a patch region in the display screen, the patch region including a detection region serving as a region for detecting a position of an object, and a counting region encompassed by the detection region and a counting unit configured to count, from among intersection points between a movement vector in the detection region of an object moving inside the display screen or a locus based on the movement vector and the detection line in the detection region, intersection points located in the counting region.

According to the second aspect of the present invention, there is provided an image processing method performed by an image processing apparatus, comprising: setting, based on a detection line that is set in a display screen, a patch region in the display screen, the patch region including a detection region serving as a region for detecting a position of an object and a counting region encompassed by the detection region; and counting, from among intersection points between a movement vector in the detection region of an object moving inside the display screen or a locus based on the movement vector and the detection line in the detection region, intersection points located in the counting region.

According to the third aspect of the present invention, there is provided a non-transitory computer-readable storage medium storing a computer program for causing a computer to function as: a setting unit configured to set, based on a detection line that is set in a display screen, a patch region in the display screen, the patch region including a detection region serving as a region for detecting a position of an object, and a counting region encompassed by the detection region; and a counting unit configured to count, from among intersection points between a movement vector in the detection region of an object moving inside the display screen or a locus based on the movement vector and the detection line in the detection region, intersection points located in the counting region.

Further features of the present invention will become apparent from the following description of exemplary embodiments (with reference to the attached drawings).

BRIEF DESCRIPTION OF THE DRAWINGS

FIG. 4 is a flowchart of processing performed by the image processing apparatus 200.

FIGS. 7A to 7E are diagrams illustrating an effect provided by the patch regions according to the first embodiment.

DESCRIPTION OF THE EMBODIMENTS

Figure 1:
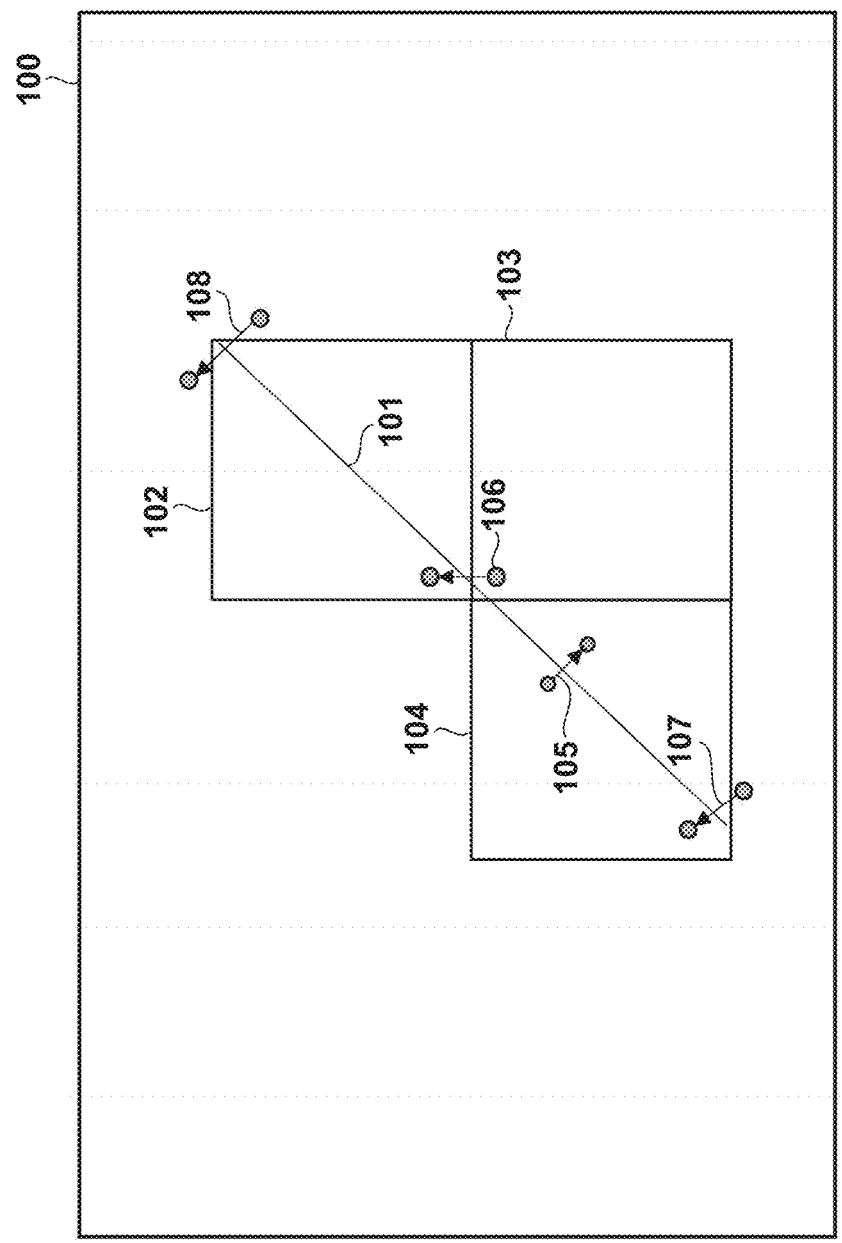
FIG. 1 is a diagram for illustrating a problem of the conventional technique.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the present embodiment, a description will be given of an image processing apparatus that counts, when a moving image resulting from imaging a monitoring target region is displayed in a display screen, the number of objects (number of passages) passing over a detection line that is se in the display screen. Although a case where "object" (i.e., a counting target) is a "person" will be described in the following, "object" is not limited to a "person", and may be another moving body.

Figure 2:
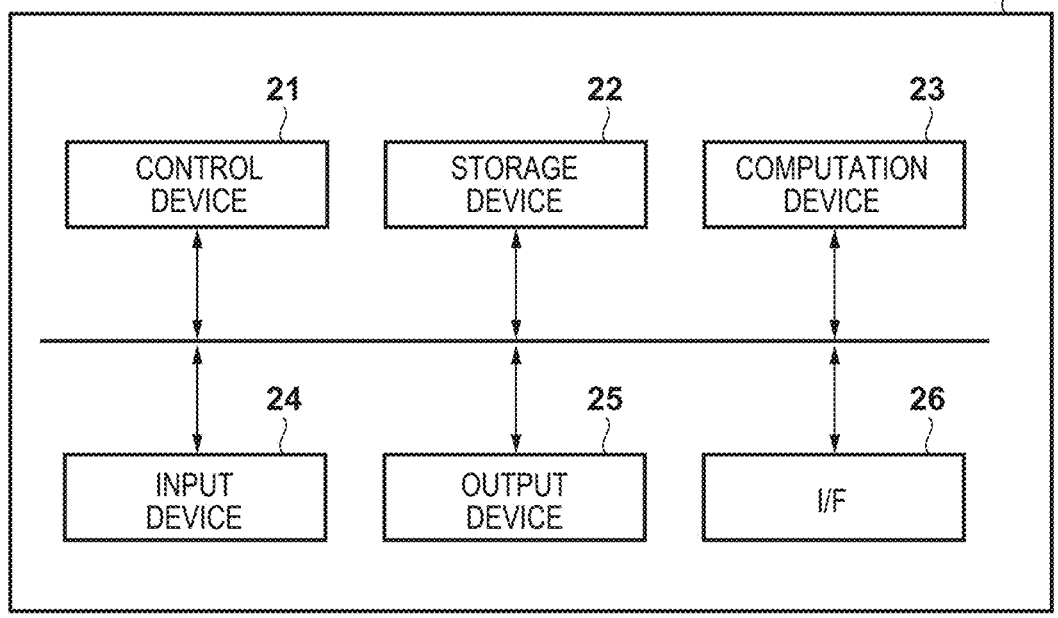
FIG. 2 is a block diagram showing an exemplary hardware configuration of an image processing apparatus 200.

First, an exemplary hardware configuration of an image processing apparatus according to the present embodiment will be described with reference to the block diagram of FIG. 2. An image processing apparatus 200 shown in FIG. 2 is a computer apparatus such as a personal computer (PC), a smartphone, and a tablet terminal apparatus.

A control device 21 includes a processor such as a CPU, and a memory device such as a RAM or a ROM. The processor executes various types of processing using a computer program and data stored in the memory device. Accordingly, the control device 21 performs overall operation control of the image processing apparatus 200, and executes or controls various types of processing, which will be described later as being executed by the image processing apparatus 200.

A storage device 22 is a nonvolatile memory in which an operating system (OS), as well as a computer program and data for causing the control device 21 (processor) to execute or control various types of processing, which will be described later as being executed by the image processing apparatus 200, are saved. The computer program and data saved in the storage device 22 are loaded into the memory device (RAM) under the control of the control device 21 (processor), and are then processed by the control device 21 (processor).

A computation device 23 performs various types of computation processing based on an instruction from the control device 21. An input device 24 is a user interface such as a keyboard, a mouse, or a touch panel screen, and allows various instructions to be input into the control device 21 (processor) by being operated by the user.

An output device 25 is a display device including a liquid crystal screen or a touch panel screen as a display screen, and can display the results of processing performed by the control device 21 using images, characters, and the like. An interface (I/F) 26 is a communication interface for performing data communication with an image capturing apparatus that captures images of a monitoring target region, an apparatus that holds a moving image resulting from imaging the monitoring target region, an apparatus that holds various computer programs and data, and so forth. The image processing apparatus 200 performs data communication with these apparatuses via the OF 26. The I/F 26 is, for example, a wired interface such as a universal serial bus, Ethernet (registered trademark), or an optical cable, or a wireless interface such as Wi-Fi or Bluetooth (registered trademark).

Figure 3:
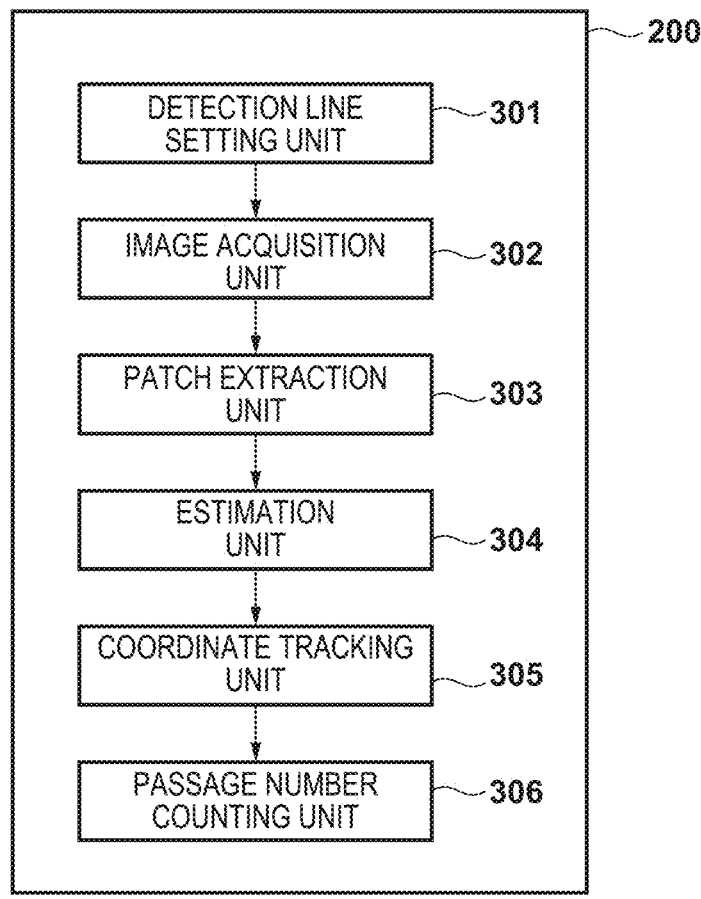
FIG. 3 is a block diagram showing an exemplary functional configuration of the image processing apparatus 200.

Next, an exemplary functional configuration of the image processing apparatus 200 according to the present embodiment will be described with reference to the block diagram of FIG. 3. Although the functional units shown in FIG. 3 will be described below as the executors of processing, the functions of the functional units are actually realized by the control device 21 (processor) or the computation device 23 executing a computer program for causing the processor or the computation device 23 to execute the functions of the functional units. Thus, the functional units shown in FIG. 3 may be implemented by software (computer program), or may be implemented by hardware.

A detection line setting unit 301 sets a detection line in the display screen of the output device 25. An image acquisition unit 302 acquires, from the outside via the I/F 26, an image (captured image) of each frame of a moving image resulting from imaging a monitoring target region. The images of the frames of the moving image are displayed in the display screen of the output device 25.

A patch extraction unit 303 sets patch regions on the display screen based on the detection line set on the display screen of the output device 25, and extracts, as "patches", partial images in the set patch regions from the captured image displayed in the display screen.

An estimation unit 304 estimates, for each patch region set by the patch extraction unit 303 (independently), a movement vector in the patch region of a person moving inside the display screen of the output device 25.

A coordinate tracking unit 305 acquires, for each patch region set by the patch extraction unit 303 (independently), a locus in the display screen of the output device 25 of a person based on the movement vector of the person estimated by the estimation unit 304 for that patch region.

A passage number counting unit 306 counts, for each patch region set by the patch extraction unit 303 (independently), the number of persons passing (number of passages) over a detection line based on the movement vectors of persons estimated by the estimation unit 304 or the loci of persons acquired by the coordinate tracking unit 305. Then, the passage number counting unit 306 determines the sum of the number of passages counted for each patch region as the number of passages for the detection line as a whole.

Next, processing that the image processing apparatus 200 performs for counting the number of persons passing (number of passages) over a detection line set in the display screen of the output device 25 will be described according to the flowchart of FIG. 4.

<Step S401>

The detection line setting unit 301 sets a detection line in the display screen of the output device 25. The method for setting the detection line is not limited to any specific setting method. For example, a moving image resulting from imaging a monitoring target region may be reproduced and displayed in the display screen of the output device 25, and the user may set a detection line in the display screen by operating the input device 24 while viewing the moving image. Alternatively, for example, the detection line setting unit 301 may reproduce and display a moving image resulting from imaging a monitoring target region in the display screen of the output device 25, detect, in the display screen, an image region of an object that involves entering and exiting of persons, such as a door or a ticket gate, and set a detection line in the vicinity of the image region. Alternatively, for example, the detection line setting unit 301 may set a detection line at an end portion of the display screen (one or more of upper, lower, left and right end portions of the display screen) of the output device 25. Alternatively, for example, the detection line setting unit 301 may reproduce and display a moving image resulting from imaging a monitoring target region in the display screen of the output device 25, detect a high-traffic region in the display screen, and set a detection line in the vicinity of that region.

<Step S402>

The image acquisition unit 302 acquires, from the outside via the I/F 26, images (captured images) of frames of a moving image resulting from imaging a monitoring target region as an input image. As described above, the images of the frames of the moving image are sequentially displayed in the display screen of the output device 25.

Here, a moving image is, for example, a streaming or video file, a series of image files saved for each frame, a movie saved in a medium, or the like. The source from which the moving image is acquired is not limited to any specific source. For example, the image acquisition unit 302 may acquire images of frames of a moving image resulting from imaging a monitoring target region by a solid-state imaging element such as a CMOS sensor or a CCD sensor, or an image capturing apparatus to which such a solid-state imaging element is mounted. Alternatively, for example, the image acquisition unit 302 may acquire, from a server apparatus, a storage device such as a hard disk or an SSD, or a recording medium, images of frames of a moving image resulting from imaging a monitoring target region.

<Step S403>

The patch extraction unit 303 sets, based on the detection line set in step S401, a patch region on the display screen of the output device 25, and extracts, as a "patch", a partial image in the patch region from an input image displayed in the display screen.

Figure 5A:
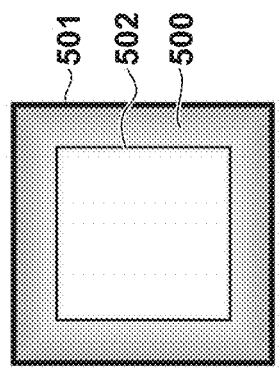
FIG. 5A is a diagram illustrating a patch region.

Here, the patch region will be described with reference to FIG. 5A. As shown in FIG. 5A, a patch region 500 is a region having a configuration in which "a counting region 502 serving as a region for counting the number of persons that have passed over a detection line is provided inside a detection region 501 serving as a region for detecting the position of a person". The center position of the counting region 502 and the center position of the detection region 501 are the same, and the counting region 502 is a reduced region similar to the detection region 501. That is, the counting region 502 has a size (pixel count) smaller than that of the detection region 501, and is encompassed by the detection region 501. In the following, the relationship between the counting region 502 and the detection region 501 is referred to as "the counting region 502 is truly encompassed by the detection region 501".

Figure 5B:
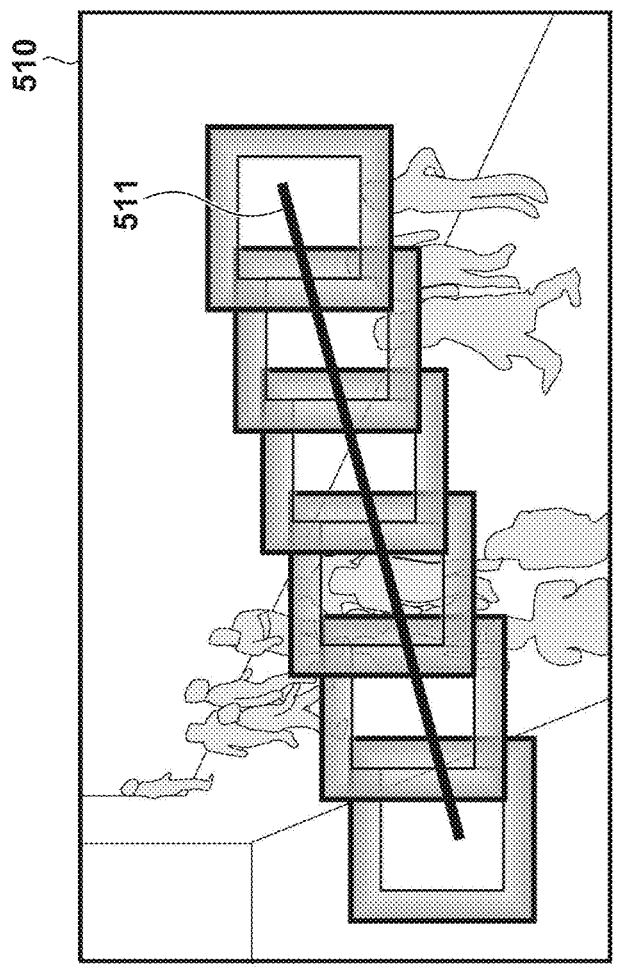
FIG. 5B is a diagram illustrating setting of patch regions based on a detection line.

Next, setting of patch regions based on a detection line will be described with reference to FIG. 5B. In the present embodiment, the patch extraction unit 303 determines the positions of patch regions in the display screen such that the entirety of a detection line is covered by the counting regions of the patch regions, and that the counting regions do not overlap each other. In FIG. 5B, the positions of six patch regions are determined such that the entirely of a detection line 511 on an input image 510 is covered by the counting regions of the patch regions.

Figure 6A:
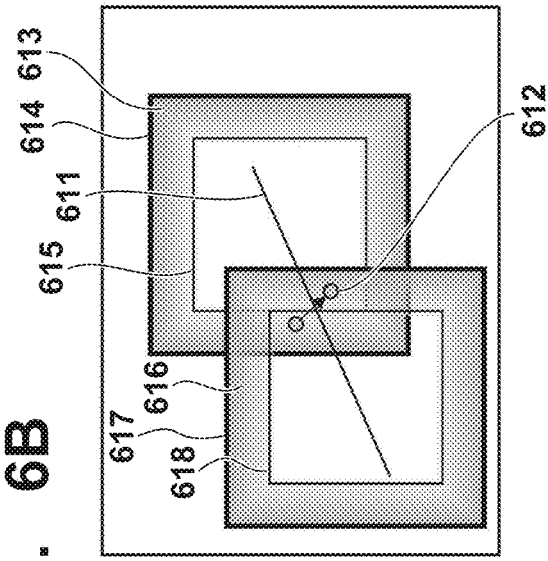
FIGS. 6A to 6D are diagrams illustrating an effect provided by patch regions according to a first embodiment.

Here, with reference to FIGS. 6A to 6D, a description will be given as to why the counting accuracy of the number of person passages is increased as a result of the counting region of a patch region being truly encompassed by a detection region. FIG. 6A shows a case where the entire region of a patch region is constituted by a detection region and a counting region (the counting region and the detection region completely coincide with each other), and such patch regions are set in the display screen. In FIG. 6A, the entirety of a detection line 601 is covered by a patch region 604 (=a counting region) and a patch region 603 (=a counting region). An arrow 602 indicates a movement vector from the position (start point) of a person at time t1 to the position (end point) of the person at time t2. In FIG. 6A, the arrow 602 intersects the detection line 601, thus representing that the person has just stepped across the detection line 601 between time t1 and time t2. Here, the start point (the position of the person at time t1) of the arrow 602 is located in the patch region 604, and the end point (the position of the person at time t2) of the arrow 602 is located in the patch region 603. Accordingly, if the estimation of a movement vector of a person and the tracking of a person are performed for each patch region, the person's passage corresponding to the arrow 602 cannot be detected in either of the patch region 603 and the patch region 604. That is, in such a case as shown in FIG. 6A, omission in counting of the number of passages occurs.

Figure 6B:
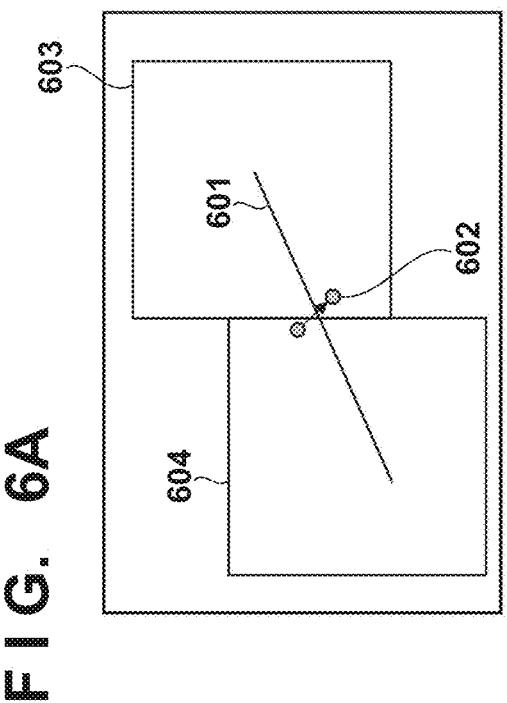

FIG. 6B shows a case where a patch region in which the counting region is truly encompassed by the detection region is set in the display screen. In FIG. 6B, the entirety of a detection line 611 is covered by a counting region 618 of a, patch region 616 (including a detection region 617 and the counting region 618) and a counting region 615 of a patch region 613 (including a detection region 614 and the counting region 615). An arrow 612 indicates a movement vector from the position (start point) of a person at time t1 to the position (end point) of the person at time t2. In FIG. 6B, the arrow 612 intersects the detection line 611, thus representing that the person has just stepped across the detection line 611 between time t1 and time t2. Here, each of the start point (the position of the person at time t1) and the end point (the position of the person at time t2) of the arrow 612 is located in bath the patch region 613 and the patch region 616. Accordingly, if the estimation of a movement vector of a person and the tracking of a person are performed for each patch region, the person's passage corresponding to the arrow 612 can be detected, and therefore omission in counting of the number of passages does not occur.

Figure 6C:
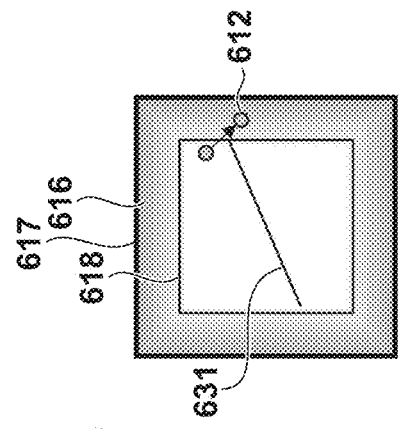

The patch region 613 in FIG. 6B is shown in FIG. 6C. A detection line 621 is a portion (line segment) of the above-described detection line 611 that overlaps the counting region 615 of the patch region 613. As described above, the start point and the end point of the arrow 612 are located in the patch region 613, and therefore the arrow 612 can be identified in the patch region 613. As a result, whether or not the arrow 612 intersects the detection line 621 can be determined in the counting region 615 of the patch region 613. Because the arrow 612 intersects the detection line 621 in the counting region 615 in FIG. 6C, it can be determined that one person has stepped across the detection line 621 between time it and time t2.

Figure 6D:
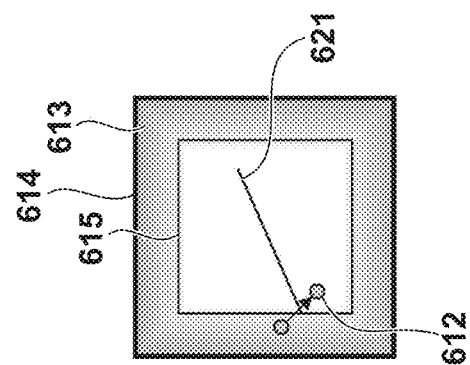

The patch region 616 in FIG. 6B is shown in FIG. 6D. A detection line 631 is a portion (line segment) of the above-described detection line 611 that overlaps the counting region 618 of the patch region 616. As described above, because the start point and the end point of the arrow 612 are located in the patch region 616, the arrow 612 can be identified in the patch region 616. As a result, whether or not the arrow 612 intersects the detection line 631 can be determined in the counting region 618 of the patch region 616. Because the arrow 612 does not intersect the detection line 631 in the counting region 618 in FIG. 6D, it can be determined that one person has not stepped across the detection line 631 between time t1 and time t2.

Because "number of passages=1" as the result of counting in FIG. 6C and "number of passages=0" as the result of counting in FIG. 6D can be obtained independently, the sum of these results "number of passages=1+0=1" can be obtained, and it can be estimated that the passage of one person over the detection line has occurred between time t1 and time t2. This is equal to a true number of passages.

Figure 7E:
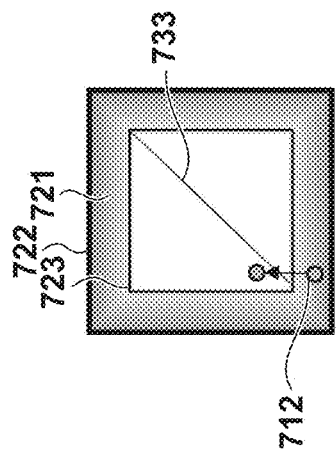

Next, with reference to FIGS. 7A to 7E showing another example, a description will be given as to why the counting accuracy of the number of person passages is increased as a result of the counting region of a patch region being truly encompassed by a detection region. FIG. 7A shows a case where the entire region of a patch region is constituted by a detection region and a counting region (the counting region and the detection region completely coincide with each other), and such patch regions are set in the display screen. In FIG. 7A, the entirety of a detection line 701 is covered by a patch region 705 (=a counting region) and a patch region 706 (=a counting region). Arrows 702, 703, and 704 respectively indicate movement vectors from the positions (start points) of persons A, B, and C at time t1 to the positions (end points) of the persons A, B, and C at time t2. In FIG. 7A, the arrow 702 intersects the detection line 701, thus representing that the person A has stepped across the detection line 701 between time t1 and time t2. In FIG. 7A, the arrow 703 intersects the detection line 701, thus representing that the person B has stepped across the detection line 701 between time t1 and time t2. In FIG. 7A, the arrow 704 intersects the detection line 701, thus representing that the person C has stepped across the detection line 701 between time t1 and time t2.

Here, the end point (the position of the person A at time t2) of the arrow 702 is located in the patch region 706, and the start point (the position of the person A at time t1) of the arrow 702 does not belong to any of the patch region 705 and the patch region 706. The start point (the position of the person B at time t1) of the arrow 703 is located in the patch region 705, and the end point (the position of the person B at time t2) of the arrow 703 does not belong to any of the patch region 705 and the patch region 706. The start point (the position of the person C at time t1) and the end point (the position of the person C at time t2) of the arrow 704 do not belong to any of the patch region 705 and the patch region 706.

Accordingly, if the estimation of a movement vector of a person and the tracking of a person are performed for each patch region, the passages of the persons A, B, and C respectively corresponding to the arrows 702, 703, and 704 cannot be detected in either of the patch region 705 and the patch region 706. That is, in such a case as shown in FIG. 7A, omission in counting of the number of passages will occur (the number of passages is erroneously counted as 0).

FIG. 7B shows a case where a patch region in which a counting region is truly encompassed by a detection region is set in the display screen. In FIG. 7B, the entirety of a detection line 711 is covered by a counting region 717 of a patch region 715 (including a detection region 716 and the counting region 717), a counting region 720 of a patch region 718 (including a detection region 719 and the counting region 720), and a counting region 723 of a patch region 721 (including a detection region 722 and the counting region 723).

Figure 7D:
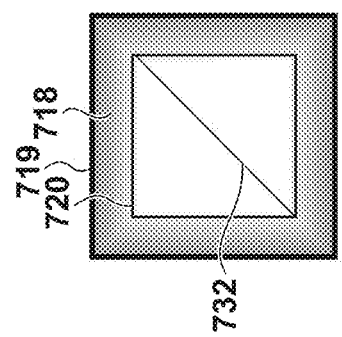
Figure 7C:
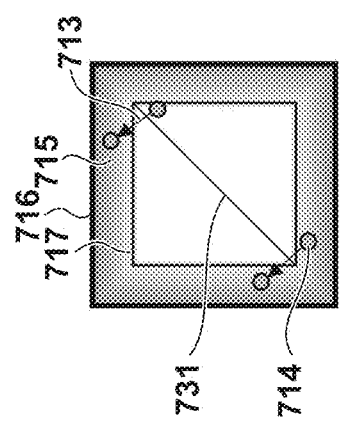

The patch region 715 in FIG. 7B is shown in FIG. 7C. A detection line 731 is a portion (line segment) of the above-described detection line 711 that overlaps the counting region 717 of the patch region 715. An arrow 713 indicates a movement vector from the position (start point) of a person at time to the position (end point) of the person at time t2. An arrow 714 indicates a movement vector from the position (start point) of a person at time t1 to the position (end point) of the person at time t2. Because the start point and the end point of the arrow 713 are located in the patch region 715, the arrow 713 can be identified in the patch region 715. As a result, whether or not the arrow 713 intersects the detection line 731 can be determined in the counting region 717 of the patch region 715. Because the start point and the end point of the arrow 714 are located in the patch region 715, the arrow 714 can be identified in the patch region 715. As a result, whether or not the arrow 714 intersects the detection line 731 can be determined in the counting region 717 of the patch region 715. In FIG. 7C, the arrow 713 intersects the detection line 731, and the arrow 714 intersects the detection line 731, and therefore it can be determined that two persons have stepped across the detection line 731 between time t1 and tune t2.

The patch region 718 in FIG. 7B is shown in FIG. 7D. A detection line 732 is a portion (line segment) of the above-described detection line 711 that overlaps the counting region 720 of the patch region 718. Because no movement vector has been detected from the patch region 718, it can be determined that the number of persons who have stepped across the detection line 732 between time t1 and time t2 is 0.

The patch region 721 in FIG. 7B is shown in FIG. 7E. A detection line 733 is a portion (line segment) of the above-described detection line 711 that overlaps the counting region 723 of the patch region 721. An arrow 712 indicates a movement vector from the position (start point) of a person at time t1 to the position (end point) of the person at time t2. Because the start point and the end point of the arrow 712 are located in the patch region 721, the arrow 712 can be identified in the patch region 721. As a result, whether or not the arrow 712 intersects the detection line 733 can be determined in the counting region 723 of the patch region 721. In FIG. 7E, the arrow 712 intersects the detection line 733, and therefore it can be determined that one person has stepped across the detection line 733 between time t1 and time 12.

Because "number of passages=2" as the result of counting in FIG. 7C, "number of passages=0" as the result of counting in FIG. 7D, and "number of passages=1" as the result of counting in FIG. 7E can be obtained independently. Thus, the sum of the results "number of passages=2+0+1=3" can be obtained, and it can be estimated that the passage of three persons over the detection line has occurred between time t1 and time t2. This is equal to a true number of passages.

Thus, as described taking FIGS. 6A to 6D and FIGS. 7A to 7E as examples, it is possible to prevent omission in counting of the number of persons passing over the detection line by setting the counting region of the patch region to be truly encompassed by the detection region. As a result, it is possible to increase the counting accuracy.

Next, a description will be given of a determination method by which the patch extraction unit 303 determines the position of the patch region based on the detection line. As described above, in the present embodiment, the center position of the counting region in the patch region and the center position of the detection region coincide with each other, and the counting region is a reduced region similar to the detection region.

First, the patch extraction unit 303 determines the size of the counting region in a patch region. For that purpose, the patch extraction unit 303 determines a ratio r1 obtained by dividing the size of the detection region in a patch region by the size of the counting region of that patch region.

Figure 8A:
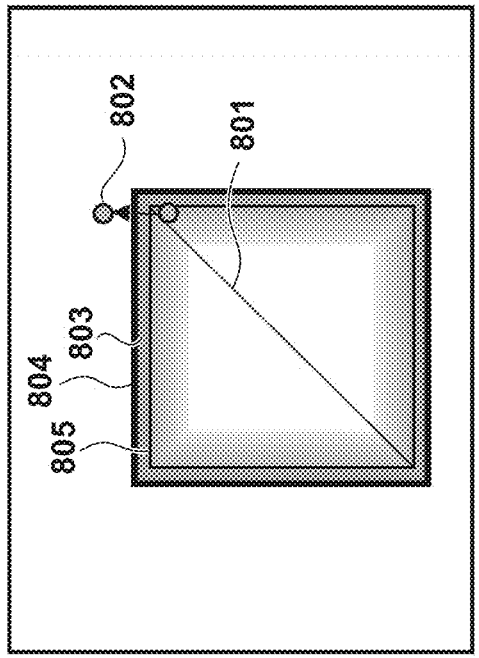
FIG. 8A is a diagram showing an example of a patch region in which a counting region has substantially the same size as a detection region.
Figure 8B:
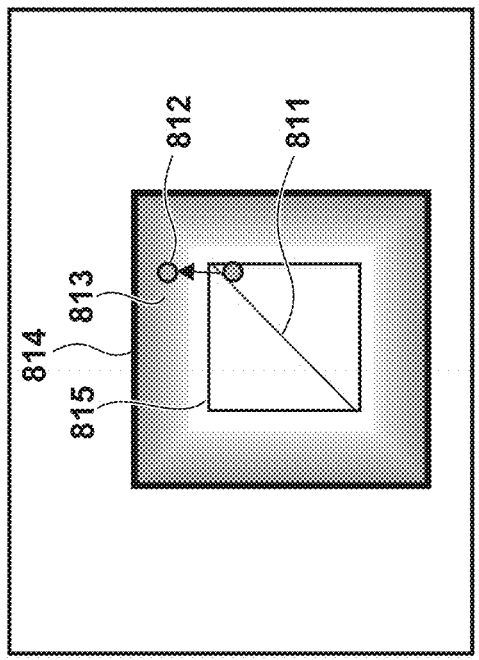
FIG. 8B is a diagram showing an example of a patch region in which a counting region formed to be smaller than the counting region shown in FIG. 8A.

There is a trade-off for the ratio FIG. 8A shows an example of a patch region in which the counting region has substantially the same size as the detection region. A patch region 803 includes a detection region 804 and a counting region 805. The end point of an arrow 802 is located outside the detection region 804, and therefore the passage of the arrow 802 on the detection line 801 cannot be detected. Next, FIG. 8B shows an example of a patch region in which the counting region is smaller than the counting region shown in FIG. 8A. A patch region 813 includes a detection region 814 and a counting region 815. The ratio of the size of the detection region 814 to the size of the counting region 815 is larger than the ratio of the size of the detection region 804 to the size of the counting region 805. Therefore, both the start point and the end point of the arrow 812 are included in the detection region 814, and the passage of the arrow 812 on the detection line 811 can be detected.

Increasing the ratio r1 is advantageous in that omission in counting of passages can be prevented. However, it is disadvantageous in that the throughput is increased due to an increase in the number of patch regions necessary to cover the entirety of the detection line.

The method for determining the ratio r1 includes a method in which the ratio r1 is determined based on the distance moved by a person between time t1 and time t2. Assuming that a person moves at a maximum speed v, a maximum movement amount moved in the real world 1w the person between time t1 and time t2 is determined. The maximum movement amount in the real world is converted into a pixel count (maximum travel pixel count) on the display screen. By determining the ratio r1 such that the pixel count between the boundary of the detection region and the boundary of the counting region is larger than the maximum travel pixel count, the number of persons moving at the maximum speed v or less can be counted without omission.

Another method for determining the ratio r1 includes a method based on statistical values in a learning period. A learning period is provided, and person's movement vectors that have been estimated during the learning period by the estimation unit 304 are collected. Then, from the collected group of movement vectors, the movement vectors having a size (size of the movement vector) rated in the top p % (e.g., p=5) are deleted, and the length of the movement vector having the largest size among the remaining movement vectors is defined as 1. Then, by determining the ratio r1 such that the pixel count between the boundary of the detection region and the boundary of the counting region is 1, at least (100−p) % of the movement vectors can be counted without omission.

Thus, by determining the ratio r1 based on the speed at which a person moves, it is possible to count the majority of movement vectors without omission, while minimizing the number of patch regions necessary to cover the entirety of the detection line. Note that the method for determining the ratio r1 is not limited to the above-described methods, and various methods can be employed.

Once the ratio r1 has been determined, the patch extraction unit 303 then determines the vertical and horizontal sizes of the counting region in the patch region as "vertical and horizontal sizes obtained by dividing the vertical and horizontal sizes of the detection region in the patch region by r1". Once the size of the counting region in the patch region has been determined, the patch region that is to be used thereafter is confirmed as a patch region having a configuration in which "a counting region having vertical and horizontal sizes obtained by dividing the vertical and horizontal sizes of the detection region by r1 is provided inside the detection region".

Next, the patch extraction unit 303 determines the positions of one or more patch regions set on the display screen such that all portions of the detection line are covered by the counting regions of the patch regions.

An example of the method for determining the positions of the patch regions in the display screen of the output device 25 is a method in which the position of each of the patch regions is determined such that the ratio between the size of the detection region in the patch region and the size of a person appearing in the patch region is substantially constant. By adopting this method, variations in the sizes of the person appearing in the patch regions are reduced, and it is therefore possible to increase the accuracy of a movement vector estimation, which will be described later.

Figure 9C:
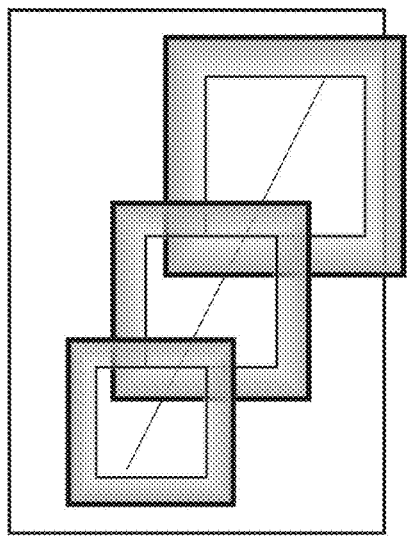
FIGS. 9A to 9C are diagrams illustrating an order in which the positions of patch regions are determined.
Figure 9B:
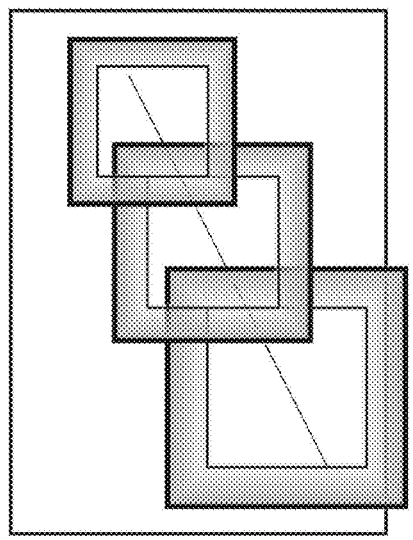
Figure 9A:
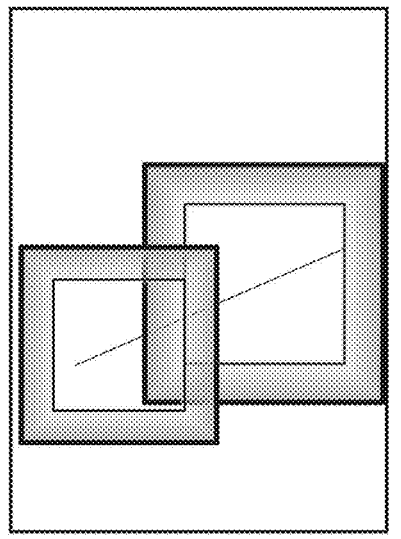

In this method, the positions of the patch regions are determined starting from one end of the detection line. The angle formed by the detection line and the positive direction of the X axis (axis in the horizontal direction) of the display screen is defined as 0. As shown in FIG. 9A, when 0 is 45 degrees or more and 135 degrees or less, the positions of the patch regions are determined starting from the lower side of the detection line. As shown in FIG. 9B, when 0 is 0 degrees or more and less than 45 degrees, the positions of the patch regions are determined starting from the left side of the detection line. As shown in FIG. 9C, when 0 is more than 135 degrees and less than 180 degrees, the positions of the patch regions are determined starting from the right side of the detection line.

Assuming that the ratio r1 obtained by dividing the size of the detection region by the size of the counting region is fixed, and that the ratio r2 obtained by dividing the size of the detection region by the size of a person in the display screen, the ratio obtained by dividing the size of the counting region by the size of a person in the display screen is r2/r1, and is fixed. Thus, the positions of all patch regions can be determined by repeatedly determining the positions of the patch regions, sequentially from an end of the detection line, so as to satisfy all of the following conditions 1 to 3.

Condition 1 . . . An end point of the remaining line segment of the detection line that has not been covered is precisely in contact with the boundary of the counting region of the patch region.

Condition 2 . . . The detection line or a straight line obtained by extending the detection line passes through the center of the counting region in the patch region.

Condition 3 . . . The ratio obtained by dividing the size of the counting region in the patch region by the size of a person appearing in the counting region is substantially equal to r2/r1 (substantially constant).

The size of a person appearing in the counting region can be estimated, for example, by manually providing a clue in advance, or by providing a learning period in advance and statistically determining the size from persons detected during the learning period. Note that the method for determining the positions of the patch regions is not limited to the above-described methods. For example, as another method, the position of each of the patch regions may be determined such that each of the patch regions is a region including a fixed pixel count wherever the patch region is located on the display screen. Alternatively, for example, the position of each of the patch regions may be determined such that the counting regions in the patch regions partly overlap each other. In this case, in order to prevent multiple counting when summing up the numbers of passages obtained in the patch regions in step S407, which will be described later, it is necessary to take measures such as averaging the numbers of passages for the overlapping portions of the counting regions.

Once the positions of the patch regions have been determined such that the entirety of the detection line is covered by the counting regions, the patch extraction unit 303 then sets the patch regions at the determined positions, and extracts, as patches, partial images in the patch regions in an input image displayed in the display screen. Then, the patch extraction unit 303 resizes each of the extracted patches into a suitable size (e.g., a size determined by the estimation unit 304).

<Step S404>

The estimation unit 304 estimates, for each of the patches acquired by the patch extraction unit 303 in step S403 (independently), a movement vector of a person in that patch (in the detection region) based on the position of the person. For estimation of the movement vector of a person in an image, various methods can be used. An example thereof will be described with reference to FIG. 10.

Figure 10:
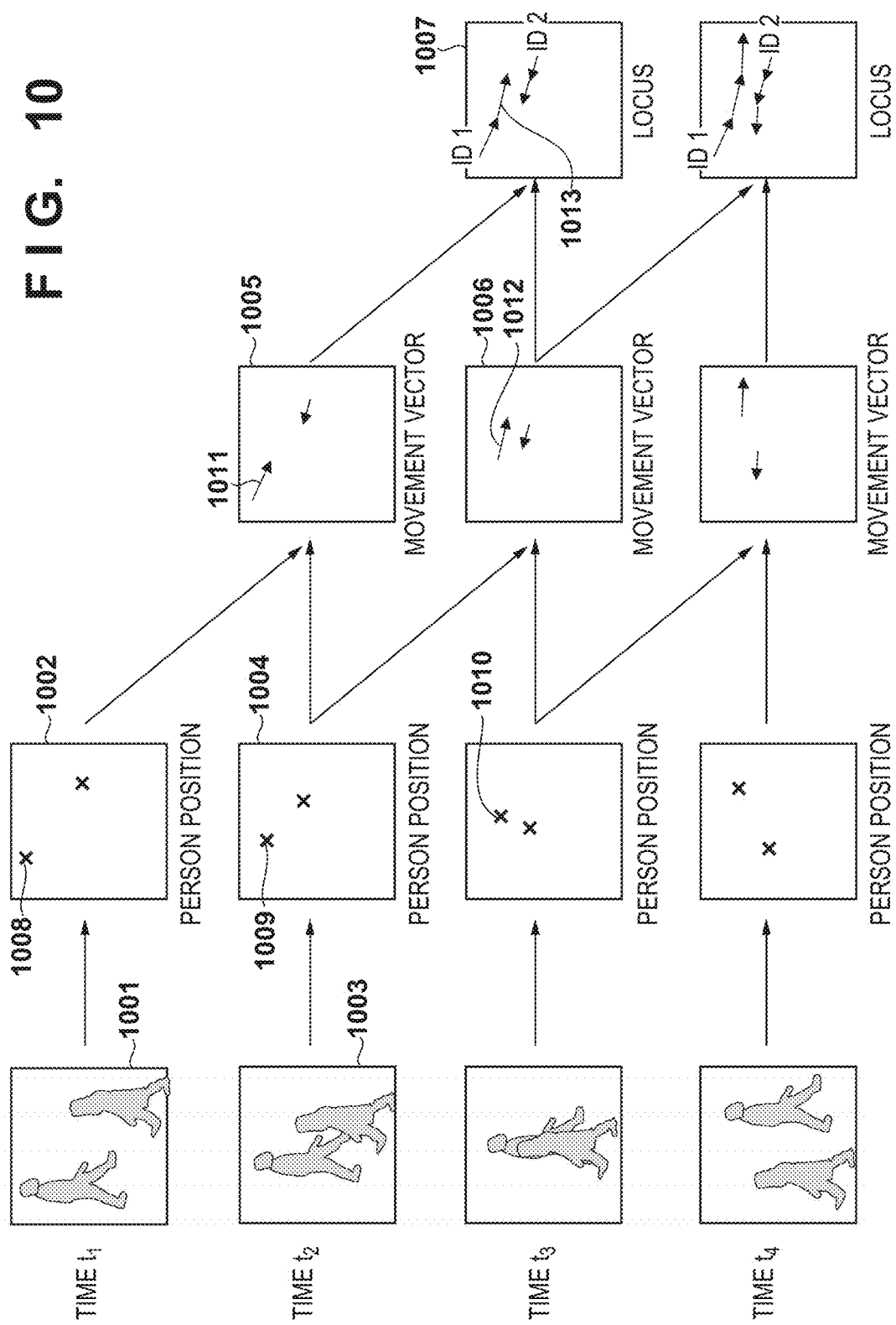
FIG. 10 is a diagram illustrating estimation of movement vectors of persons in an image.

In the method shown in FIG. 10, the estimation unit 304 estimates a list of person positions at each time ti from the patches. The person position is defined as the position of a specific part of a person, including, for example, the center of the head or the center of the trunk of the person. For example, the estimation unit 304 receives, as an input, a patch 1001 extracted from an input image of a frame at time t1, and estimates a list of person positions (see a rectangle 1002) in the patch 1001 at time t1. A marker 1008 in the rectangle 1002 schematically indicating a person position in the list is a marker indicating a person position in the patch 1001. Also, the estimation unit 304 receives, as an input, a patch 1003 extracted from an input image of a frame at time t2, and estimates a list of person positions (see a rectangle 1004) in the patch 1003 at time t2. A marker 1009 in the rectangle 1004 schematically indicating a person position in the list is a marker indicating a person position the patch 1003. Subsequently, the estimation unit 304 performs optimum matching between a list of the person positions corresponding to time (t−1) and a list of the person positions corresponding to time ti. A "movement vector at time ti" is obtained that has a person position at time t(i−1) as a start point and a person position at time ti as an end point that are associated as a result of the optimum matching. For example, the estimation unit 304 receives, as inputs, a list of the person positions corresponding to time t1 (the positions of the markers 1008 in the rectangle 1002) and a list of the person positions corresponding to time t2 (the positions of the markers 1009 in the rectangle 1004), and obtains a list of the movement vectors 1011 at time t2 (see a rectangle 1005 schematically indicating the movement vectors in the list).

The details of each processing will be described below. The details of the estimation of person positions will be described. For the estimation of person positions, various method can be used. For example, an object detector that identifies the position of a specific part of a person can be used for the estimation of person positions. The object detector output the position of an object in a rectangular format or a mask image format. The object detector can be learned using a machine learning method such as deep learning. A representative point such as the center of gravity of an output result can be used as the position of a person.

For the estimation of person positions, a method using a density distribution may be used. A density distribution is a representation of locations where a person is estimated to be present in a given input image. The density distribution may be, for example, a uniform distribution corresponding to the size of a person fir which the number of passages is to be counted, or may be an arbitrary distribution having a maximum at a position where a person is highly likely to be present. Examples of the latter include a Gaussian distribution. A density distribution estimator that estimates a density distribution can be learned using a machine learning method such as a deep learning. Furthermore, from the density distribution estimated by the density distribution estimator, a person position estimator that estimates a position of a person can be learned using a machine learning method such as deep learning. That is, it is possible to estimate a density distribution from an input image using the density distribution estimator, and estimate a person position from the density distribution using the person position estimator.

In FIG. 10, a method in which a patch at time ti is received as an input is adopted for the estimation of a person position at time ti. However, an estimator that receives patches at a plurality of times as inputs, or estimates person positions at a plurality of times may be used for the estimation of person positions. For example, in order to estimate a person position at time ti, an object detector that receives both a patch at time t(i−1) and a patch at time ti as inputs, and outputs the position of a person at time t(i−1) and the position of the person at time ti may be used.

The details of the optimum matching between a list of the person positions corresponding to time t(i−1) and a list of the person positions corresponding to time ti will be described. In matching of person positions, it is desirable to minimize the total sum of costs in the matching. Examples of algorithms for performing such matching include Hungarian matching, linear programming, and a neural network. As a cost in the matching, it is possible to define, for example, a cost based on the distance between a pair of person positions associated by the matching, or the difference between the feature amounts of local images. By carrying out matching so as to minimize the total sum of costs, it is possible to perform optimum matching taking into account the overall optimum.

By using the person positions of a person at time t(i−1) and time ti associated as a result of this optimum matching as a start point and an end point, respectively, a vector directed from the start point toward the end point is obtained as the movement vector of that person at time ti.

<Step S405>

The coordinate tracking unit 305 tracks, based on the movement vector of a person estimated by the estimation unit 304 for each of the patches acquired by the patch extraction unit 303 (independently), the position of that person.

A result of tracking the position of a person is referred to as a locus. The locus can be generated by connecting movement vectors together. For example, let us assume that "movement vector A at time ti having a person position at time t(i−1) as a start, point and a person position at time ti as an end point" and "movement vector B at time t(i−1) having a person position at time ti as a start point and a person position at time t(i+1) as an end point" are estimated. If the end point of the movement vector A and the start point of the movement vector B are the same position (person position), the coordinate tracking unit 305 determines the movement vector A and the movement vector B that are connected together as a locus. An ID (e.g., an ID unique to each person) for differentiate between loci is given to a locus.

The operation of the coordinate tracking unit 305 will be described taking FIG. 10 as an example. The movement vector 1011 at time t2 is a movement vector obtained from the result of matching the person position (marker 1008) at time t1 and the person position (marker 1009) at time t2. A movement vector 1012 at time t3 is a movement vector obtained from the result of matching the person position (marker 1009) at time t2 and a person position (marker 1010) at time t3. Because the end point of the movement vector 1011 at time t2 and the start point of the movement vector 1012 at time t3 are the same person position (marker 1009), a locus 1013 is generated from these movement vectors.

<Step S406>

The passage number counting unit 306 counts, for each of the patches acquired by the patch extraction unit 303 (independently), the number of persons that have passed (number of passages) over the detection line based on the movement vectors of persons estimated by the estimation unit 304 or the loci of persons calculated by the coordinate tracking unit 305.

The count of the number of passages can be obtained substantially in the same manner in the case of using either movement vectors or loci. The count of the number of passages can be obtained by determining whether an intersection point between a locus or a movement vector of a person and a detection line is present in the counting region in a patch region. For example, the intersection point between the arrow 612 and the detection line 621 is present in the counting region 615 in the patch region 613 shown in FIG. 6C, and it is therefore determined that the passage of one person has occurred.

Thus, the passage number counting unit 306 counts, for each of the patch regions, the number of "intersection points between a movement vector or a locus and a detection line" in the counting region of that patch region. That is, the passage number counting unit 306 only counts the number of "intersection points between a movement vector or a locus and a detection line" inside the counting region, and does not count the number of "intersection points between a movement vector or a locus and a detection line" outside the counting region.

Note that the passage number counting unit 306 can also count the number of passages for each direction of passage by determining in what direction a locus or a movement vector passes through a detection line. The determination of intersection between a locus or a movement vector and a detection line can be performed, for example, by a geometrical method such as determining an intersection between a line segment and a line segment.

In the case of counting the number of passages using loci, it is necessary to impose a limitation such that the number of passages is not counted multiply when the same person makes such a movement as to repeatedly step across the detection line. To realize this, the direction of passage and the number of passages over the detection line may be stored for each of the IDs given to the loci.

<Step S407>

The passage number counting unit 306 determines, as the "number of passages of persons on the entirety of detection line", the total sum of the numbers of passages counted for each of the patch regions in step S406. Note that the passage number counting unit 306 may also count the number of passages for each direction in which the detection line is passed.

Note that each of the processing of steps S404 to S406 described above is processing that can be independently executed for each patch, and therefore the number of passages can be counted at high speed by executing a series of processing from steps S404 to S406 in parallel for each patch.

Thus, according to the present embodiment, the position of a patch region is dynamically determined based on a given detection line. The patch region is composed of two regions, namely a detection region for which estimation of a specific object is to be performed, and a counting region for which counting is to be performed. By determining the position of a patch region such that all portions of the detection line are covered by the counting region of any of the patch regions, it is possible to perform high-speed processing through parallelization, while the deviation of the number of passages for the detection line as a whole being kept small.

Although an example in which the object for which the number of passages is to be counted is a person has been described in the present embodiment as above, a subject that can be used as such an object is not limited to a person, and any objects whose number can be counted can be used. Examples of such objects include riding objects such as a bicycle and a motorcycle, vehicles such as a car and a truck, animals such as livestock, cells, and microorganisms.

Second Embodiment

In the first embodiment, the configuration for counting the number of passages on the entire detection line has been described. The number of passages counted in this manner may be displayed on the display screen of the output device 25, or may be transmitted to an external apparatus via the I/F 26. In the case of displaying the number of passages on the display screen of the output device 25, the number of passages may be displayed as a character string (numerals representing the number of passages), or may be displayed as an icon whose size, length, color or the like is changed according to an increase or a decrease in the number of passages. That is, the output destination and the output form of the counted number of passages are not limited to any specific output destination and output form.

The image processing apparatus 200 may be an apparatus separate from the source of a moving image, or may be an apparatus integrated with the source. In the latter case, for example, the image processing apparatus 200 may be incorporated into an image capturing apparatus that captures images of a monitoring target region, and the number of objects that have passed over the detection line may be counted for a moving image captured by that image capturing apparatus.

Note that the numerical values, processing timing, processing order and the like used in the above description are given as examples for providing a specific description, and the invention is not intended to be limited to these numerical values, processing timing, processing order and the like.

Some or all of the embodiments described above may be combined as appropriate. Some or all of the embodiments described above may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) fix performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-044386, filed Mar. 13, 2020, which is hereby incorporated by reference herein in its entirety.

What is claimed is:

1. An image processing apparatus comprising:
one or more memories storing instructions; and
one or more processors that execute the instructions for:
    setting, based on a detection line that is set in a display screen, a patch region in the display screen, the patch region including a detection region serving as a region for detecting a position of an object, and a counting region encompassed by the detection region; and
    counting unit configured to count, from among intersection points between a movement vector in the detection region of an object moving inside the display screen or a locus based on the movement vector and the detection line in the detection region, intersection points located in the counting region.

2. The image processing apparatus according to claim 1, wherein a size of the counting region in the patch region is determined according to a speed of the object in the display screen.

3. The image processing apparatus according to claim 1, wherein a position of each of individual patch regions in the display screen is determined such that the counting regions in the individual patch regions do not overlap.

4. The image processing apparatus according to claim 1, wherein the position of the patch region in the display screen is determined such that a ratio between a size of the detection region and a size of an object appearing in the patch region is substantially constant.

5. The image processing apparatus according to claim 1, wherein the counting is performed in parallel for each patch region.

6. The image processing apparatus according to claim 1, wherein a sum of the numbers of the intersection points counted for each patch region is obtained as the number of objects that have passed over the detection line.

7. The image processing apparatus according to claim 6, wherein the one or more processors execute further instructions for
outputting the obtained sum.

8. The image processing apparatus according to claim 1, wherein the one or more processors execute further instructions for:
    acquiring a moving image captured by an image capturing apparatus that captures images of a monitoring target region,
    wherein an image of each frame in the moving image is displayed in the display screen.

9. The image processing apparatus according to claim 8, wherein the image processing apparatus is integrated with the image capturing apparatus.

10. An image processing method performed by an image processing apparatus, comprising:
    setting, based on a detection line that is set in a display screen, a patch region in the display screen, the patch region including a detection region serving as a region for detecting a position of an object and a counting region encompassed by the detection region; and
    counting, from among intersection points between a movement vector in the detection region of an object moving inside the display screen or a locus based on the movement vector and the detection line in the detection region, intersection points located in the counting region.

11. A non-transitory computer-readable storage medium storing a computer program for causing a computer to function as:
- a setting unit configured to set, based on a detection line that is set in a display screen, a patch region in the display screen, the patch region including a detection region serving as a region for detecting a position of an object, and a counting region encompassed by the detection region; and
- a counting unit configured to count, from among intersection points between a movement vector in the detection region of an object moving inside the display screen or a locus based on the movement vector and the detection line in the detection region, intersection points located in the counting region.

* * * * *